United States Patent [19]
Porat

[11] Patent Number: 5,671,038
[45] Date of Patent: Sep. 23, 1997

[54] MULTIFOCAL CONTACT LENS

[75] Inventor: Menachem Porat, Kibbutz Hanita, Israel

[73] Assignee: Hanita Lenses, Kibbutz Hanita, Israel

[21] Appl. No.: 517,123

[22] Filed: Aug. 21, 1995

[30] Foreign Application Priority Data

Aug. 22, 1994 [IL] Israel ............... 110740

[51] Int. Cl.$^6$ ............... G02C 7/04
[52] U.S. Cl. ............... 351/161
[58] Field of Search ............... 351/161, 160 R, 351/160 H, 162

[56] References Cited

U.S. PATENT DOCUMENTS

| | | | |
|---|---|---|---|
| 3,246,941 | 4/1966 | Moss | 351/160 R |
| 3,688,386 | 9/1972 | Pereira | 351/160 R |
| 3,971,910 | 7/1976 | Marschalko et al. | 219/121 L |
| 4,211,476 | 7/1980 | Brummel | 351/160 R |
| 4,239,712 | 12/1980 | Neefe | 264/2.2 |
| 4,666,267 | 5/1987 | Wichterle | 351/160 H |
| 4,798,609 | 1/1989 | Grendahl | 351/161 |
| 5,044,742 | 9/1991 | Cohen | 351/161 |
| 5,245,367 | 9/1993 | Miller et al. | 351/161 |
| 5,293,184 | 3/1994 | Ishizuka | 346/161 |
| 5,430,504 | 7/1995 | Muckenhirn et al. | 351/161 |

FOREIGN PATENT DOCUMENTS

| | | |
|---|---|---|
| A 2582416 | 11/1986 | France. |
| A 4108339 | 9/1991 | Germany. |
| 39-27282 | 11/1964 | Japan. |
| WO A 8404401 | 11/1984 | WIPO. |

OTHER PUBLICATIONS

Mandell, Robert B; "A No-Jump Bifocal Contact Lens"; *Optometric Weekly*; Jun., 1967; vol. 58, No. 22, pp. 19-21.
Patent Abstracts of Japan, vol. 11, No. 389 (P-648) 19 Dec. 1987 & JP-A-62 153 932 (FYUJIARAI) 8 Jul. 1987 abstract.

*Primary Examiner*—Georgia Y. Epps
*Assistant Examiner*—Jordan M. Schwartz
*Attorney, Agent, or Firm*—Pennie & Edmonds LLP

[57] ABSTRACT

A multifocal contact lens having a posterior surface and an anterior surface, includes a distance vision segment and a near vision segment, and at least one hole through which the posterior surface and the anterior surface communicate with each other.

12 Claims, 1 Drawing Sheet

U.S. Patent  Sep. 23, 1997  5,671,038
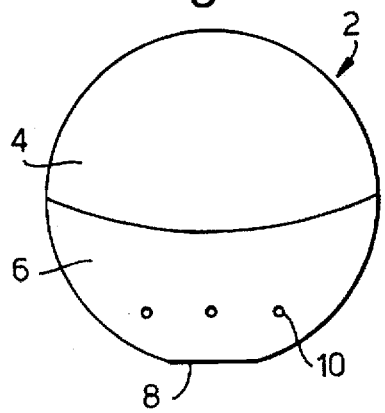
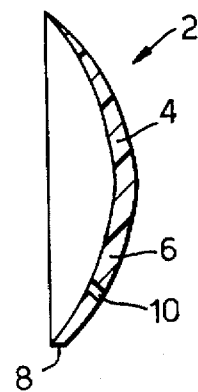
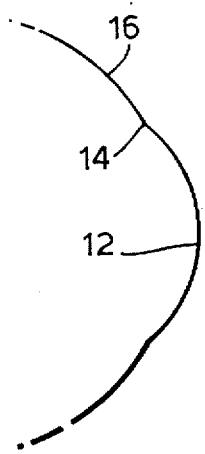
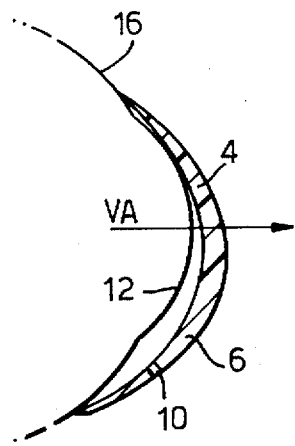
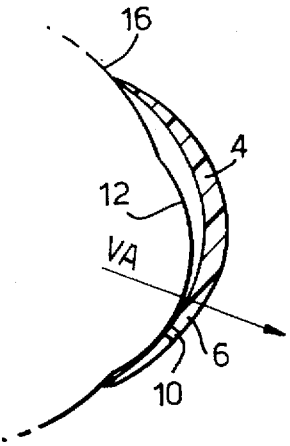
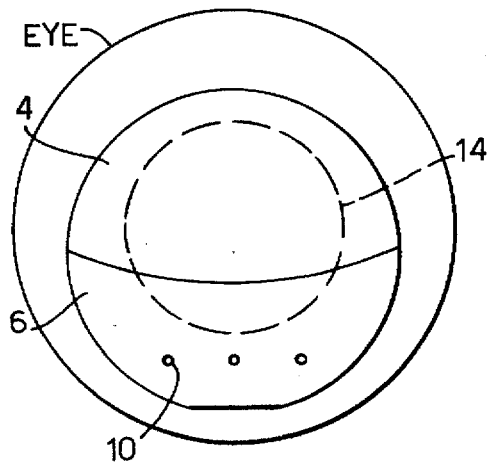
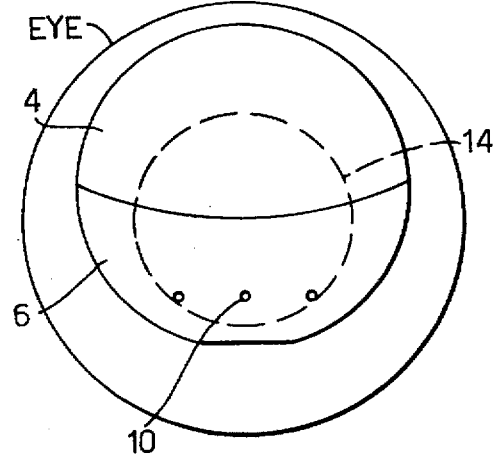

MULTIFOCAL CONTACT LENS

BACKGROUND OF THE INVENTION

The present invention relates to multifocal contact lenses.

Multifocal contact lenses, more particularly, bifocal contact lenses, would be as freely used as are monofocal or single-power contact lenses, if it were not for a serious problem found with prior art contact lenses of this type: As for near vision, the visual axis of the eye must pass through the lower segment of the lens, and for distance vision, the axis must pass through the upper segment of the lens, it is clear that a relative motion must be produced between the eyeball and the lens to switch from one type of vision to the other. In fact, upon downgazing for near vision, the lens is supposed to be pushed up by the lower eyelid, while return to distance vision is mainly left to gravity.

However, particularly with soft contact lenses of a diameter larger than the cornea, the discrete space between the posterior surface of the clinging lens and the cornea-limbus-sclera region of the eye varies when the above-mentioned relative movement takes place, subjecting the volume of tears confined in that space to variations of pressure that produce a resistance to movement, i.e., to the pushing motion of the lower eyelid, which is liable to cause considerable discomfort, if not pain, to the wearer, as well as unsatisfactory movement.

In certain types of prior art bifocal lenses known as "ballasted," an attempt was made to overcome this problem by having the lens very thick at its lower, truncated segment, thereby reducing the specific pressure on the lower eyelid. While this somewhat improved the above problem, it created a new one: the heavy cross-section of the ballasted lens cuts off the supply of oxygen from the air to the cornea and parts of the sclera, thus interfering with the proper metabolism of these tissues.

SUMMARY OF THE INVENTION

It is thus one of the objects of the present invention to provide a multifocal contact lens that will provide communicative passageways between the eye/lens interface and the free atmosphere, and will enhance oxygen supply to the lens-covered eye tissues.

According to the invention, the above objective is achieved by providing a multifocal contact lens having a posterior surface and an anterior surface, comprising a distance vision segment and a near vision segment, characterized by the provision of at least one hole through which said posterior surface and said anterior surface communicate with each other.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

In the drawings:

FIG. 1 is a front view of a bifocal contact lens according to the invention;

FIG. 2 is a cross-sectional view of the lens of FIG. 1;

FIG. 3 is a schematic representation of the outlines of the human eye;

FIG. 4 shows the relative position of the cornea and the lens for distance vision;

FIG. 5 shows the relative position of the cornea and the lens for near vision;

FIG. 6 indicates the position of the lens on the eyeball for distance vision, and FIG. 7 indicates the lens position for near vision.

DETAILED DESCRIPTION OF THE INVENTION

Referring now to the drawings, there is seen in FIGS. 1 and 2 a bifocal lens 2 constituted of a distance vision segment 4 and a near vision segment 6. The lower edge 8 is slightly truncated and, in a per se known manner, assists in maintaining the required proper orientation of the lens 2.

In the lower part of the lens segment 6, there are seen three small holes 10 of a diameter of approximately 0.5 mm. It is through these holes that the tear-filled space between the posterior surface of the lens 2 and the cornea 12 and the sclera 16 communicates with the free atmosphere. This prevents the generation of over- or underpressures that impair the movement of the lens in both directions, and also facilitates access of oxygen-containing air to the eye tissues covered by the contact lens.

The outlines of part of the human eye are schematically represented in FIG. 3, showing the cornea 12, the limbus 14, and the solera 16. The cornea region is defined within the confines of the limbus 14 to include the cornea 12.

The location of the lens 2 relative to the cornea 12 in the distance vision position is clearly seen in FIG. 4, with the visual axis VA of the eye passing through the distance vision segment 4 of the lens 2. In the distance viewing position, the holes 10 preferably come to be located outside of the cornea region of the eye, as is also shown clearly in FIG. 6.

In FIG. 5, the lens 2 is seen as pushed up relative to the downgazing eye, so that the visual axis VA passes through the near vision segment 6 of the lens 2.

Frontal views of the location of the contact lens 2 on the eye for distance vision and for near vision are represented in FIGS. 6 and 7, respectively.

There may be either less or more than three holes 10 and while the holes 10 are seen to be located along a straight line, they may also be located along a circle or any other curve.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A multifocal lens having a posterior surface and an anterior surface for use on an eyeball having a cornea region, comprising an upper distance vision segment for distance viewing, and a lower near vision segment for near viewing, wherein at least one hole is provided through which said posterior surface and said anterior surface communicate with each other to prevent the generation of over- or underpressures that impair the movement of the lens relative to the eyeball, said at least one hole, or if more than one hole is present, all of said holes, being located in said near vision segment of said lens and arriving outside of said cornea region during distance viewing.

2. The contact lens as claimed in claim 1, wherein said near vision segment is provided with a truncated lower edge.

3. The contact lens as claimed in claim 1, wherein there is provided a plurality of holes located in a lower part of said near vision segment.

4. The multifocal lens as claimed in claim 1, wherein said at least one hole is located in a lower part of said near vision segment.

5. A multifocal contact lens having a posterior surface and an anterior surface for use on an eyeball having a cornea region which comprises:

a top portion which includes a distance vision segment;

a bottom portion which includes a near vision segment; and at least one hole extending through the bottom portion of the lens to prevent the generation of over- or underpressures that impair movement of the lens relative to the eyeball, wherein said at least one hole, or if more than one hole is present, all of said holes arrive outside of the cornea region when said cornea region is aligned for viewing through the distance vision segment.

6. The multifocal contact lens of claim 5, wherein the bottom portion has an upper and a lower half and the at least one hole is located in the lower half.

7. A multifocal lens having a posterior surface and an anterior surface for use on an eyeball having a cornea region, which comprises:

a top and a bottom half, said top half including a distance vision segment and said bottom half including at least a near vision segment, said bottom half including at least one hole, or if more than one hole is present, all of said holes, extending from the posterior to the anterior surface to allow for communication therebetween, wherein said hole or holes prevent the generation of over- or underpressures that impair movement of the lens relative to the eyeball and said at least one hole, or if more than one hole is present, all of said holes, is positioned outside of the cornea region when said cornea region is aligned for distance viewing through the distance vision segment so as to not interfere with distance viewing.

8. The multifocal lens of claim 7, wherein the distance vision segment occupies a portion of the bottom half.

9. The multifocal lens of claim 7, wherein three holes are disposed in the bottom half.

10. The multifocal lens of claim 7, wherein said at least one hole comprises a plurality of holes and each of said holes is positioned outside of the cornea region when said cornea region is aligned for viewing through the distance vision segment.

11. The multifocal lens of claim 10, wherein the plurality of holes are arranged in a line.

12. The multifocal lens of claim 11, wherein the line is curved.

* * * * *